Nov. 9, 1943.    H. SCHNEIDER    2,333,682
HYDRAULIC TRANSMISSION
Filed July 8, 1940    5 Sheets-Sheet 1

Inventor:
Heinrich Schneider
By
McCanna, Wintercorn + Morsbach
Attys.

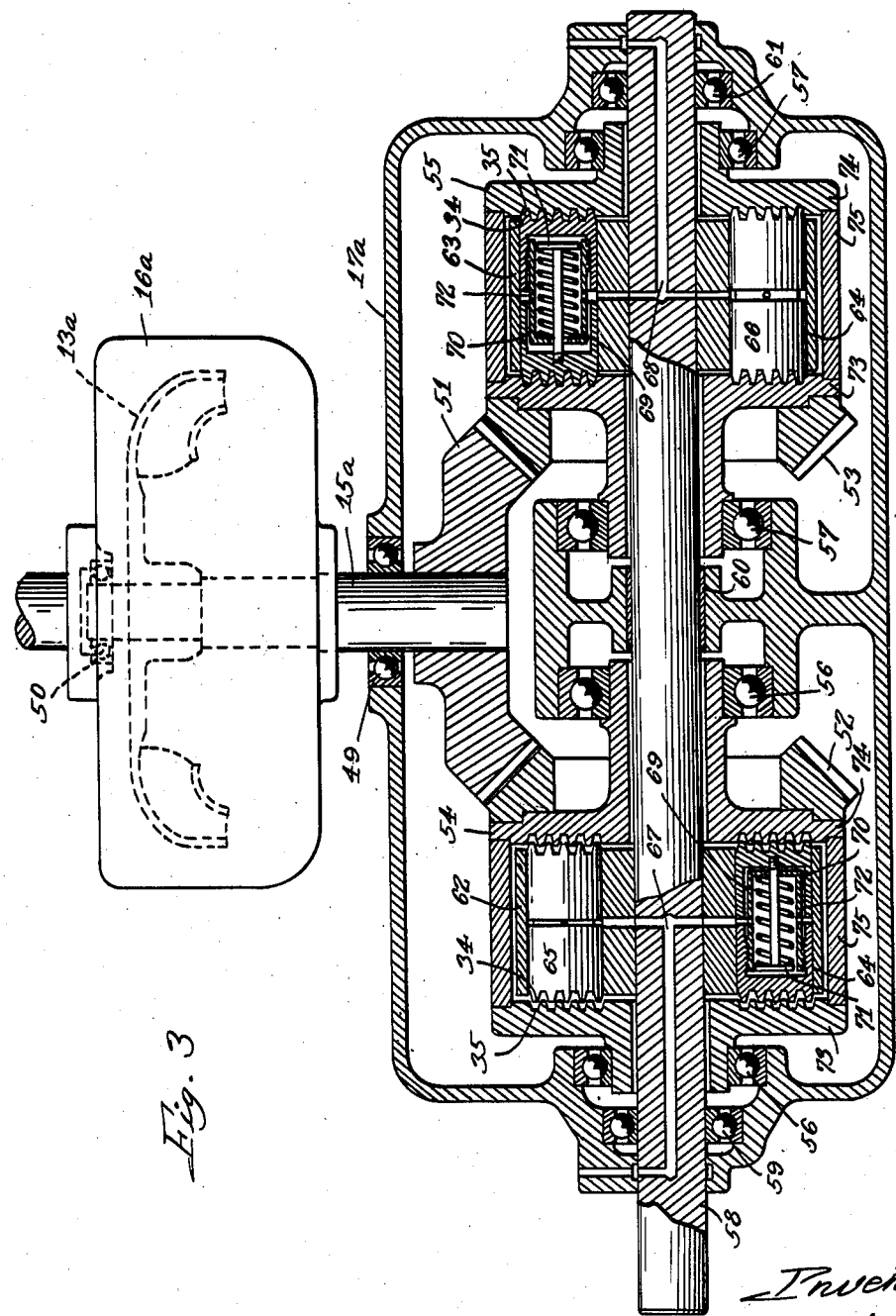

Nov. 9, 1943.   H. SCHNEIDER   2,333,682
HYDRAULIC TRANSMISSION
Filed July 8, 1940   5 Sheets-Sheet 3
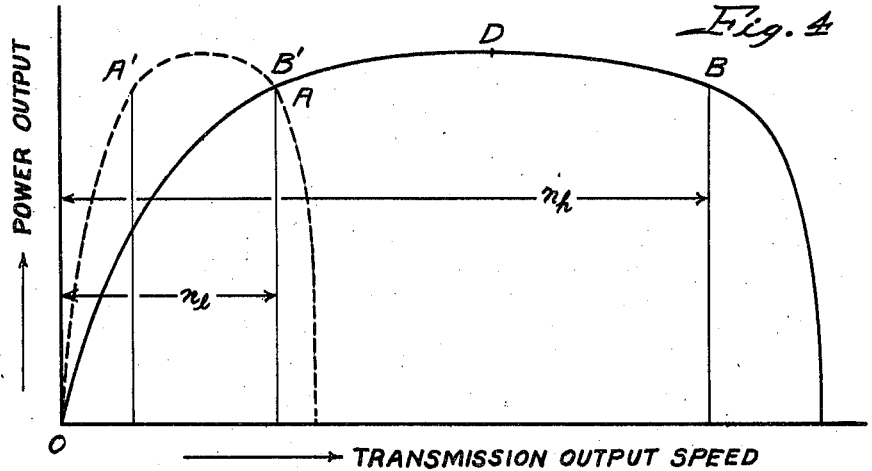
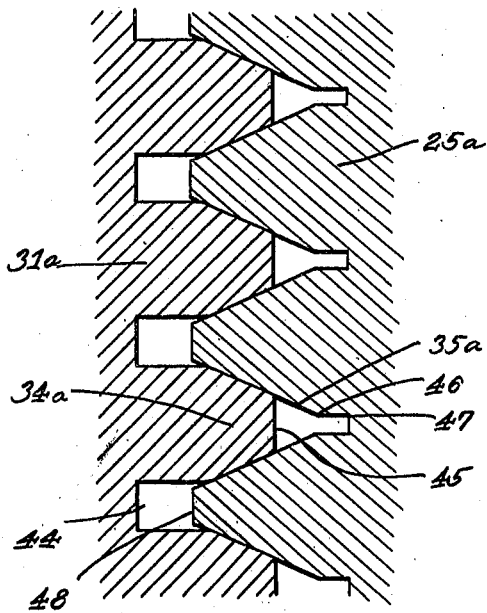
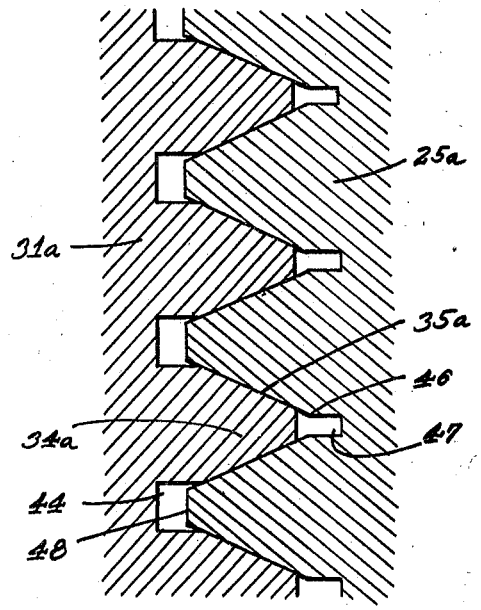
Inventor:
Heinrich Schneider

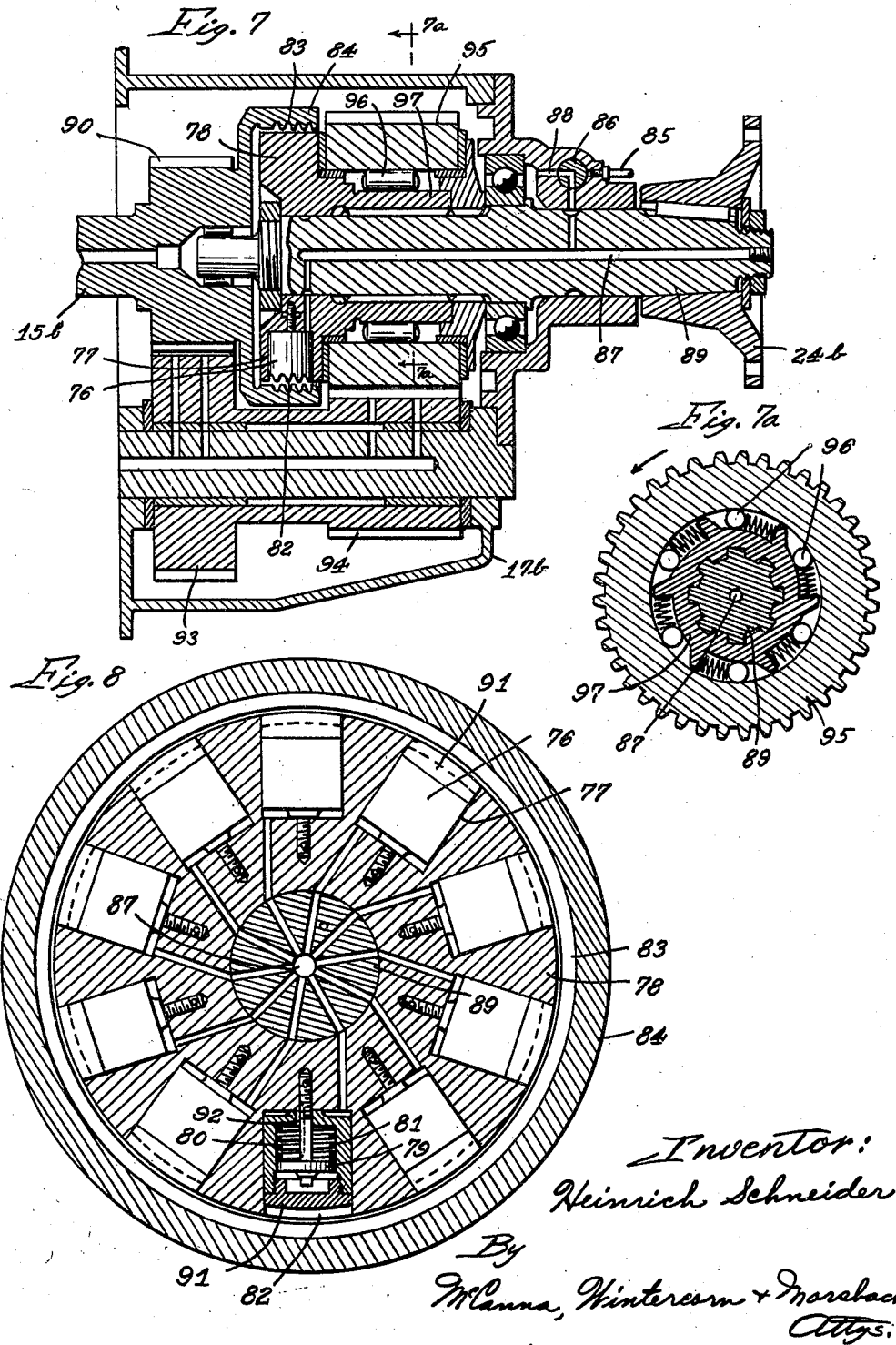

Nov. 9, 1943.        H. SCHNEIDER              2,333,682
                    HYDRAULIC TRANSMISSION
                    Filed July 8, 1940        5 Sheets-Sheet 5
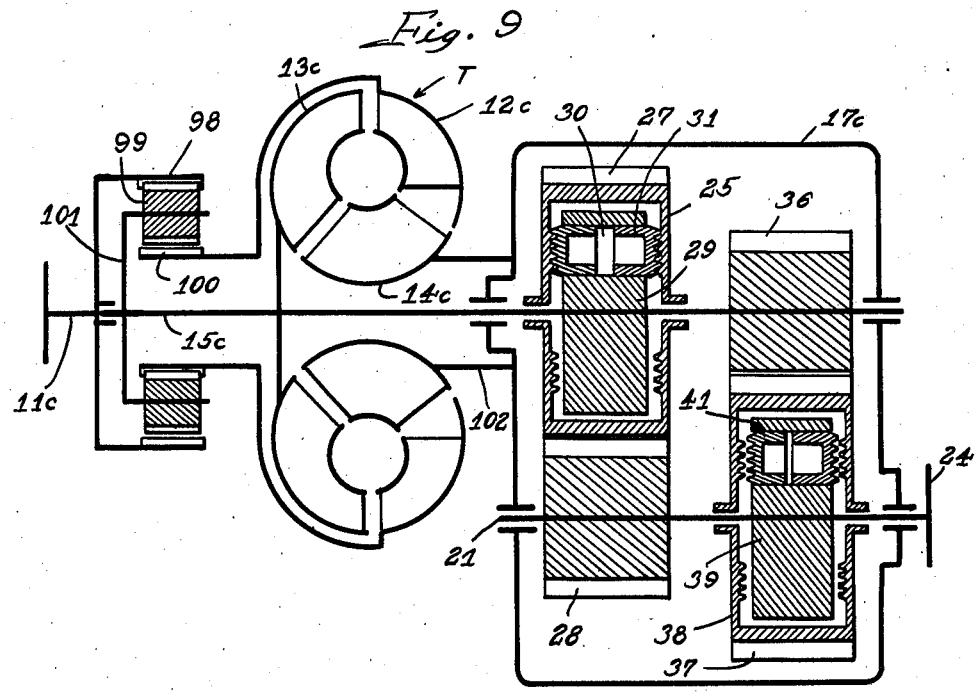
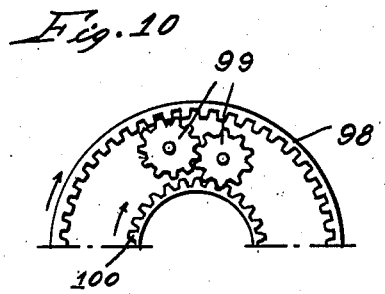
Inventor:
Heinrich Schneider
By
McCanna, Wintercorn & Morsbach
Attys.

Patented Nov. 9, 1943

2,333,682

UNITED STATES PATENT OFFICE 2,333,682

HYDRAULIC TRANSMISSION

Heinrich Schneider, Hamilton, Ohio, assignor to Schneider Brothers Company, a copartnership composed of Heinrich Schneider and Viva Schneider, both of Hamilton, Ohio, and Adolf G. Schneider, and Erna Schneider, both of Muncie, Ind.

Application July 8, 1940, Serial No. 344,300

21 Claims. (Cl. 74—189.5)

This application is a continuation in part of an application filed March 19, 1938, Serial No. 196,784.

This invention relates to improvements in hydraulic transmissions.

A review of the development of transmissions during the past forty years shows that friction clutches have been used in connection with multiple step gear boxes on vehicles having engines up to several hundred horse-power rating. Above this power, friction clutches have not proven satisfactory. Hydraulic torque converters came to replace the multiple step gear boxes and eliminate the friction clutches. The principal effort in this field of hydraulic transmissions has been to provide converters having a wide range of high efficiency, or increase the efficiency over a larger operating range and at the same time keep the torque increase high enough to permit elimination of the multiple step gear boxes, and while there has been considerable progress in this direction, each design was found to represent a compromise by reason of a sacrifice in torque or high efficiency range, while at the same time involving complications in construction and operation in addition to increased cost, particularly in the cases where multiple turbine drives were used or adjustable blades and multiple stage converters and other such combinations. It is therefore the principal object of my invention to take what may be regarded as a middle course and provide a torque converter of the simplest and most efficient design in combination with a multiple step gear box in which the gear sets are adapted to be engaged with friction surfaces many times smaller and surface pressure many times larger than has heretofore been regarded as feasible in the absence of a turbo drive, the aim being to secure engagement of the gear sets without much slippage, and hence without appreciable wear, thus permitting the friction clutches to be made relatively small in relation to the power transmitted, while relying entirely upon the turbo drive for smooth gradual pick-up, fluid slippage in the converter taking the place of mechanical slippage in the clutches.

Whereas mechanical gear transmissions in locomotives and rail cars could be used only up to about three hundred horse-power, lately somewhat higher, on account of wear and unsatisfactory operation of the friction clutches to engage gear sets for higher power, with my invention several thousand horse-power can be transmitted, engaged and disengaged with the special type of friction clutches mentioned used in combination with a turbo drive. In the present invention, I have taken into account and separated the two principal functions of a friction clutch—the main function being to transmit power from one shaft to another while acting as a mere coupling, and the other function being to synchronize the two shafts by slidable engagement of the friction surfaces, thereby consuming the synchronizing energy of the shafts and the masses and members connected therewith. In a Diesel locomotive, for example, the driving shaft turns with the engine and the driven shaft with the wheels of the locomotive and the train being drawn, and in that case the friction clutch, without the use of a hydraulic turbine drive, must therefore synchronize the rotating masses of the Diesel engine with the speed of the train and accordingly has to absorb a great amount of energy, which in the case of an ordinary clutch would be converted into a great amount of heat by the friction surfaces. In accordance with my invention, however, the function of synchronization of the rotating speed of the Diesel to the speed of the driven shaft and all parts of the train connected therewith is assumed by the turbo drive while the friction clutch assumes the function of a mere coupling between the rotating shafts. The clutch, in other words, merely synchronizes a floating rotor in the turbo drive with the locomotive wheels. The synchronizing energy absorbed by the friction clutch is therefore so small in relation to the total synchronizing energy necessary without a torque converter that the clutch can be designed primarily for the function of transmitting power and secondarily as a slippage and heat consuming element. As a result, the friction surfaces can therefore be of very small dimensions, down to about one-twentieth the size required in an ordinary friction clutch, while the engaging pressure is up to as high as forty times that used in ordinary friction clutches. In other words my invention makes possible the use of clutches of extremely small dimensions, and space, cost, and weight are correspondingly substantially reduced. The small dimensional clutches furthermore make for a reduction in the surface speed, thus further reducing danger of overheating, distortion and scoring. In fact, the clutches can be so small that they may be, and preferably are, provided in the gears themselves without necessarily increasing the gear dimensions required for transmitting the power. So far as I am aware, wherever friction clutches have heretofore been provided inside of gears, over-dimensioned gears were required in order to provide the large friction surfaces necessary in those designs with their low engaging pressures.

Another feature of the present invention consists in the utilization of hydraulically actuated clutch pistons whereby to eliminate mechanical complications and permit practically universal application of the invention to various designs of transmissions.

Still another feature is the provision of a plurality of pairs of pistons with V-shaped ridges and grooves thereon to fit mating grooves and ridges in cooperating clutch parts, said interfitting ridges and grooves providing the contacting friction faces for the clutches, with a view to providing increased areas of friction surfaces in relatively confined spaces, so that proportionately greater reduction in the size of the clutch units is made possible, the interfitting ridges and grooves having the advantage of insuring uniform wear and consequently uniform engagement substantially throughout the life of the clutches.

Other objects and advantageous features of the invention will appear in the course of the following detailed description, in which reference is made to the accompanying drawings, wherein—

Fig. 3 illustrates the combination of a hydraulic drive with a reversing mechanism, the clutches herein shown being of a modified or alternative design;

Fig. 4 is a diagram illustrating the operation of the combination of a torque converter and auxiliary gear box;

Figs. 5 and 6 are enlarged sectional details of the ridge and groove friction surfaces employed in the clutches shown in Figs. 1 and 3, Fig. 5 being before and Fig. 6 after a certain period of service;

Fig. 7 shows another auxiliary gear box suitable for use in the present novel combination illustrated in Fig. 1, this auxiliary gear box embodying still another modified or alternative design of hydraulic piston type clutch;

Figure 1:
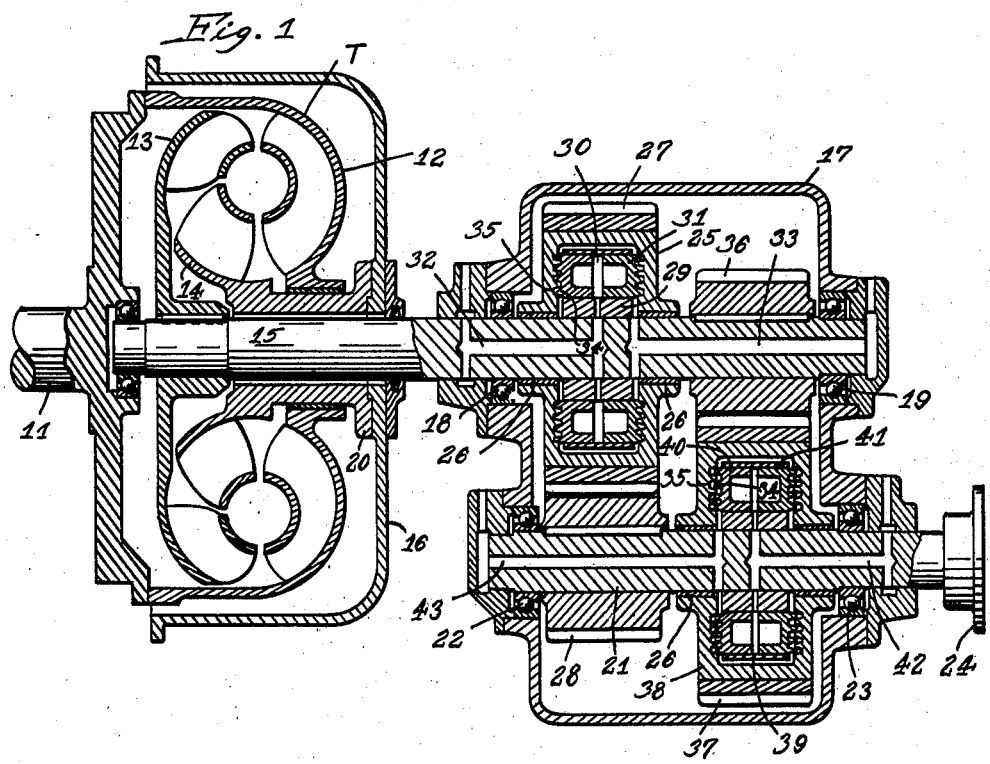
Figure 1 is a longitudinal section through a hydraulic transmission made in accordance with my invention, the same consisting of a hydraulic torque converter with an auxiliary two-speed gear box.

Fig. 7a and Fig. 8 are cross-sections through the free wheeling clutch and piston type clutch respectively, shown in Fig. 7; and Fig. 9 is a more or less diagrammatic illustration of still another combination of a hydraulic torque converter and an auxiliary two-speed gear box with hydraulic piston type clutches, the torque converter having the impeller thereof driven through dual planetary gears, as illustrated in Fig. 10 to form a floating rotor.

Similar reference numerals are applied to corresponding parts throughout the views.

Figure 2:
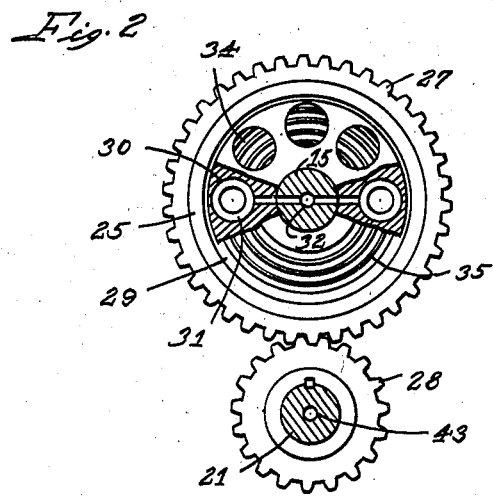
Fig. 2 is a cross-section of one of the two gear sets shown in Fig. 1.

Referring first to Figs. 1 and 2, 11 designates the primary or driving shaft, such as the crank shaft, of an engine or other prime mover and 12 is the impeller of a hydraulic torque converter T turning with the shaft 11. The torque converter includes a turbine wheel 13 and stationary reaction member 14. The turbine wheel 13 drives the secondary shaft 15 which extends from the torque converter housing 16 into the gear box housing 17, where it is received in bearings 18 and 19. The reaction member 14 is held stationary by a connection with the housing 16 as indicated at 20. 21 is a countershaft in the housing 17, received in bearings 22 and 23, and having a coupling flange 24 provided on the projecting end thereof for connection with the device to be driven, whether it be a vehicle or industrial machinery. A hollow clutch drum 25 is freely rotatable with respect to the shaft 15 on bearings 26 and has a ring gear 27 fixed on its periphery meshing with another gear 28 keyed on the countershaft 21. A hub 29 suitably secured to the shaft 15 has a plurality of longitudinal bores 30 provided therein in equally circumferentially spaced relation, all at the same radial distance from the axis of the shaft 15 and parallel thereto. Two oppositely facing pistons 31 are slidable in each of these bores and are adapted to be moved outwardly away from one another under oil pressure, oil being admissible through passages 32 to the bores 30 under high pressure to force the pistons 31 apart and oil being admissible through other passages 33 under a lower pressure to the inside of the drum 25 to return the pistons when the high pressure is relieved. The pistons 31 have a number of concentric arcuate ridges 34 provided on their head ends, struck with the axis of the shaft 15 as a center and adapted to fit in corresponding circular grooves 35 provided on the side walls inside the drum 25, whereby the pistons 31 when forced outwardly under oil pressure engage their ridges in the grooves in the drum 25 to clutch the drum and turn it with the shaft 15. On the other hand when the oil pressure in the bores 30 is relieved and oil under pressure is supplied through the passages 33 to force the pistons 31 inwardly to retracted positions, the drum 25 will be accordingly released from driving connection with the shaft 15.

The gear 36 is keyed to the shaft 15 and meshes with another gear 37 fixed on the periphery of another clutch drum 38, similar to the drum 25 and mounted to turn freely with respect to the counter-shaft 21 on bearings 26. A hub 39 similar to the hub 29 is suitably secured to the counter-shaft 21 to turn therewith and has bores 40, similar to the bores 30 previously mentioned, with oppositely facing pistons 41 arranged to cooperate with the walls of the drum 38 similarly as in the hydraulic clutch previously described. It will be noticed that the pistons 41 are shown in disengaged relation to the drum 38, whereas the pistons 31 are shown in engaged relation to the drum 25. Passages 42 supply oil under high pressure to the bores 40 to force the pistons outwardly, whereas oil under low pressuer is supplied through passages 43 to the inside of the drum 38 to return the pistons when the high pressure is relieved.

In operation, assuming that the high pressure passages 32 and 42 are at atmospheric pressure, whereas the passages 33 and 43 are continuously connected to the low pressure oil supply, thus keeping the pistons 31 and 41 in retracted relation to the drums 25 and 38, respectively, no connection exists between the gear 27 and shaft 15 on the one hand or the gear 37 and the shaft 21 on the other hand. Hence if the impeller 12 of the torque converter T is driven, the turbine wheel 13 will rotate at its maximum speed and the gear pair 36—37, the motion of which is determined by the shaft 15, will also turn, but the gear pair 27—28, the motion of which is determined by the counter-shaft 21, will stand still. If high pressure oil is supplied through passages 32 to force the pistons 31 outwardly into clutching engagement with the drum 25, the countershaft 21 will be turned at a speed above that of the shaft 15 determined by the speed ratio of the gears 27 and 28. If, on the other hand, the high oil pressure is relieved in passages 32 so as to allow the return of the pistons 31 under low pressure from the oil delivered through passages 33, the gears 27 and 28 are disconnected from driving relation with the shaft 15, and if thereafter oil under high pressure is delivered through passages 42 to move the pistons 41 into clutching engagement with the drum 38, the counter-shaft 21 will then be turned at a lower speed than the shaft 15 determined by the speed ratio of the gears 36 and 37. In other words, either of two different speed ratios may be selected. The important advantages of the invention will be apparent if one takes into consideration the fact that the counter-shaft 21 in the driving of a vehicle such as a locomotive is connected at 24 to heavy moving parts having large mass and large moment of inertia, and if one also takes into consideration the fact that the impeller 12 of the torque converter T is driven by a prime mover of also comparatively heavy mass and large moment of inertia. Two of the three independently movable systems cannot change their speeds suddenly without the application of a large force. The first of these systems is the engine whose shaft is shown at 11 and the attached pump impeller 12 of the torque converter, and the second of these systems comprises the driven masses of the main machinery (such as a locomotive) together with the counter-shaft 21 and attached hub 39 and gear pair 27—28. In the conventional clutch design, synchronization and connection must be established between these two systems directly when a clutch is engaged, and, due to the heavy masses of these systems, even a slight speed change in either system during the process of engagement necessitates dissipating a comparatively large amount of energy which must necessarily be lost as heat energy in the friction surfaces of the clutch. With the present invention, that highly undesirable condition is avoided because there is provided between the two masses a floating rotor of comparatively small mass and moment of inertia forming the third independently movable system. In Fig. 1, this third system comprises the turbine wheel 13 together with the secondary shaft 15 and the gear pair 36—37. When a clutch engagement occurs with the present gear box it will establish a speed relation between the secondary shaft 15 and the counter-shaft 21 different from the one existing before the engagement. The forces necessary to bring about this change in speed will substantially be determined by the speed change of the secondary shaft 15 alone, the reason for this being that the masses attached to the counter-shaft 21 have a substantially larger movement of inertia than the masses attached to the shaft 15, forming the floating rotor, and I have found that in any kind of turbo-hydraulic machinery there is no appreciable resistance to a quick change in speed of one of the rotating members beyond the moment of inertia of the rotating wheels, the only additional resistance involved being the inertia resistance of the fluid particles, which is generally much smaller than the inertia resistance of the wheel changing its speed. As a result, whereas with other designs there must be a comparatively slow engagement in order not to impose any undue or even destructive stresses on the machinery, with the present design I have found it entirely feasible and practical to employ piston type clutches of the kind illustrated at 31 and 41, having considerably smaller frictional engaging surfaces but higher engaging pressures, these clutches being designed primarily for the function of transmitting power and only to a negligible extent as slip and heat consuming elements. The slip between the large masses of the prime mover on the one hand and the driven machinery on the other is absorbed in the torque converter T. I have found by extensive tests that with my invention, using these piston type clutches, engaging pressures a plurality of times as high as that used in ordinary friction clutches in the absence of a turbo drive, in a range up to forty times as high, and friction surfaces the area of which is a fraction of that used in the absence of the turbo drive, in a range down to one-twentieth of the area, can be successfully used in combination with a turbo ring drive. That makes it possible to use clutches of unusually small dimensions so that space, cost, and weight are greatly reduced. The smallness of the clutch units furthermore reduces the surface speed of the engaging faces, thus further reducing the danger of overheating, distortion, and scoring. Moreover, there is nothing to prevent the use of these clutches in conjunction with very high powered prime movers, and, in accordance with my invention, gear boxes can now be designed for two thousand horse-power, or even more, in combination with a turbo-hydraulic drive. The quickness with which one may shift from one speed ratio to another with the present invention is also quite an advantage as compared with the performance of other transmissions available and insures an almost uninterrupted power flow.

In Figs. 5 and 6, I have shown a special design of the interengaging ridges and grooves for the piston type clutches shown at 31 and 41 in Fig. 1. In any clutch operating with frictional engagement, there is bound to be a certain amount of wear on the contacting surfaces accumulating during the service of the clutch, and I propose by giving these surfaces the special shape shown to improve their contact by wearing and continuously regenerating the original shape of contacting surfaces. In these enlarged sections, 31a is the piston head which is made of a material that is relatively soft in comparison to the friction faces of the clutch drum 25a, which are preferably of hardened steel. The arcuate ridges 34a have arcuate grooves 44 of rectangular cross-section therebetween and the ridges have flat crowns 45 of appreciable width. The grooves 35a in the hardened steel drum, on the other hand, are provided of increased depth, so that their width at 46 adjacent the mouths of the grooves 47 is substantially narrower than the width of the crowns 45 of the ridges 34a. The crowns 48 between the grooves 35a are appreciably smaller in width than the grooves 44. With this construction, it is apparent that the ridges 34a fit snugly in the grooves 35a and without any possibility of jamming. What little wear occurs will be on the sides of the ridges 34a, so that ultimately the parts may assume the relationship shown in Fig. 6, it being clear in this figure that the clutch is still serviceable and much more wear can occur on the ridges 34a before the clutch would no longer operate satisfactorily.

Clutches of this piston type can be used anywhere where a floating rotor is provided in the train of power flow by means of a turbo-hydraulic rotor. For instance, a hydraulic coupling can be used as distinguished from a torque converter, and there are numerous applications when that is feasible or even of advantage. The combination with a hydraulic torque converter, however, especially with one of particular characteristics to be described later, brings with it a number of very special and new advantages which make the present combination in most cases superior to most other kinds of power transmissions, so far as uniformly high efficiency and power is concerned.

The purpose of any multiple step gear box is, of course, to make the same power available at different speeds. One of the main properties of any torque converter, on the other hand, is to have a virtually constant power output over a certain speed range. Thus, if the range of virtually constant power output reaches from full turbine speed to one-third of the latter, the introduction of an auxiliary ratio of 1:3 will not introduce a break in the power supply, because then the maximum speed of the output shaft at which it will still supply a large enough fraction of the full power at the low speed ratio will coincide with the minimum speed at which it will start supplying that same fraction at the high speed ratio, and therefore after the shift is completed the power, speed, and torque of the output shaft will still be the same as before the shift. Fig. 4 illustrates this diagrammatically. Power output is shown as a function of the output speed. The full line curve shows the power output on the counter-shaft when the high gear ratio is engaged. Due to torque converter characteristics, this power output rises from zero at the point 0 at zero shaft speed until at a certain speed $n_l$ it reaches a value at A where a power output and efficiency is reached which is still tolerable for continuous application. 75%-80% efficiency has been found to constitute a limiting value of that nature. After rising to its peak point at D the power output drops down again until at a speed $n_h$ of the counter-shaft the same limiting value is reached at point B. If now the gear box ratio is made equal to the ratio of the speeds $n_h$ and $n_l$ the power output curve with the low speed engaged in the gear box will look like it is shown in the dotted line. The limiting power will first be reached at A' and then again at B' which coincides with A'. If the shift is made at the latter point, no break in the power output will occur and it can be seen that over a very large range—from A' to B—there is virtually constant power output regardless of speed.

It can be seen from the foregoing, that for auxiliary gear boxes of this nature, very high steps in ratio can be used depending only upon how great the speed range is at which the turbo-hydraulic transmission alone will supply substantially constant power.

It follows from this that in order to obtain best results, a converter should be chosen which has a substantially constant secondary power output at high efficiency over a wide speed range, the highest speed of which is a large multiple of the lowest. In a copending application, Serial No. 327,270, filed April 1, 1940, I have set forth a torque converter which has very high efficiencies at higher speeds, while no special effort is made to keep the torque at stalling exceptionally high. This converter will out-perform any design known to me if used in connection with an auxiliary gear step of the proper magnitude.

Fig. 3 illustrates the use of hydraulic piston clutches similar to those shown in Fig. 1 in another combination where, instead of providing for two-speed drive, provision is made for reverse in the direction of drive. This reversing mechanism can, of course, be used with various combinations, in front or behind a multiple step gear box, the aim being to provide a floating rotor similarly as in Fig. 1 by means of a turbo-hydraulic connection, so that the total moment of inertia is small in comparison with the moment of inertia of a prime mover on one side of the transmission and the driven machinery on the other side. In Fig. 3, the numeral 16a designates the housing of a turbo-hydraulic drive of either the torque converter or fluid flywheel type having its secondary wheel 13a connected to the secondary shaft 15a which extends into the reverse gear box 17a and is received in bearings 49 and 50. A bevel gear 51 on the shaft 15a meshes with two opposed coaxial bevel gears 52 and 53 which are fixed to hollow clutch drums 54 and 55, respectively. The drum 54 is supported in bearings 56 and the drum 55 in bearings 57. 58 is a cross-shaft which is independently supported in bearings 59, 60, and 61 in the housing 17a and has one end thereof projecting from the housing, as shown, for connection with the machinery to be driven. Hubs 62 and 63 suitably fixed on the shaft 58 are disposed inside the drums 54 and 55, respectively. Bores 64 provided in these hubs parallel to the shaft axis and in equally circumferentially spaced relation and all at the same radius from the shaft axis contain pairs of pistons 65 and 66 which in conformity with the disclosures in Figs. 1 and 5 have arcuate ridges 34 on their heads adapted to engage in circular grooves 35 provided on the inner faces of the side walls of the drums 54 and 55. Oil may be admitted to the bores 64 through passages 67 and 68 to force the pistons apart. The pistons are normally retracted toward one another under the action of compression springs 69, each of which has its one end acting against the end wall of a thimble 70 attached to one of the two pistons of a pair and its other end acting against the head end 71 of a rod projecting through a hole in the end wall of the thimble and attached to the other piston of the pair. The thimbles 70 are perforated at circumferentially spaced points intermediate the ends thereof, as indicated at 72, for easy inflow and outflow of oil. With this type of construction, it isn't necessary to have the clutch drums 54 and 55 oil tight, and each of these drums may therefore simply consist of two opposing plates 73 and 74 with a ring-shaped separator 75 therebetween, the three parts named being, of course, suitably secured together.

In the operation of this reverse gear when there is no oil pressure active on the pistons 65 or 66, the pairs of pistons are all held in retracted position and there is accordingly no power transmitted from the shaft 15a to the shaft 58. The pistons 66 are shown engaged and the pistons 65 disengaged. With the piston 66 engaged, the shaft 58 is turned in a certain direction depending, of course, upon the direction of rotation of the shaft 13a, but with the pistons 65 engaged the shaft 58 is turned in the opposite direction. This combination again provides a floating rotor similarly as in the combination of Fig. 1, the rotor in this instance comprising the two clutch drums 54 and 55 together with the three bevel gears 51, 52 and 53, secondary shaft 15a and rotor 13a. The piston type of clutch is therefore practical in this combination and it is possible to shift from forward to reverse when both the prime mover and driven machinery are in motion. During the shift, the floating rotor has to reverse completely its direction of rotation. This, however, is possible since in most turbo hydraulic drives the driven rotor can run at a speed opposite the one of the driving rotor. After the shift is made, of course, a considerable amount of torque would be exerted to reverse the direction of rotation of the cross-shaft 58 and the driven machinery. This, however, can take place smoothly and with the clutches already in a fully engaged position.

In Figs. 7 and 8 I have shown the use of a freewheeling clutch in an auxiliary gear box 17b adapted to be used in place of the gear box 17 in Fig. 1. The shaft 15b in other words may be considered an extension of the shaft 15 of Fig. 1. Although freewheeling clutches are of a quicker gripping type, they will also work as well with a turbo-drive as the piston type clutches previously described. The gear box shown in Fig. 7 incorporates in addition another piston type clutch similar to the other piston type clutches previously described but having the pistons 76 thereof movable in radial bores 77 in the hub 78. Each piston 76 has a radial guide member 79 anchored in the hub 78, the guide having the head portion thereof slidable in the bore 80 inside the piston. A coiled compression spring 81 acts between the head end of the guide 79 and the inner end of the piston to urge the piston inwardly to retracted position. However oil may be delivered under pressure to the inner end of the bores 77 to force the pistons outwardly to cause engagement of the arcuate ridges 82 on the head ends of the pistons in the annular grooves 83 provided on the inside of the rim 84 that surrounds the hub 78. A pressure connection 85 is shown as controlled by a rotary valve 86, and the valve is adapted to deliver oil under pressure to the passage 87 in one position but in another position is adapted to place the passage 87 in communication with the atmosphere through a passage 88. Oil from the passage 87 in the shaft 89 is delivered to all of the bores 77 simultaneously so as to force all of the pistons 76 outwardly toward clutching engagement with the rim 84 provided on the gear 90. There are plugs 91 inserted in the outer ends of the pistons 76 which provide the ridges 82 thereon. Any suitable means may be provided for preventing turning of the pistons 76 from positions where the ridges 82 are parallel with the grooves 83; in Fig. 8 I have shown a key 92 on the piston working in a keyway in the stem of the radial guide member 79. The operation of this form of piston type clutch is substantially the same as that disclosed in Figs. 1 and 2.

The freewheeling clutch used in conjunction with the piston type clutch in the auxiliary gear box shown in Fig. 7 is provided for the low ratio drive. The gear 93 meshes with the gear 90 and has a gear 94 turning therewith which meshes with a gear 95. The gear 95 is freely rotatable in relation to the driven shaft 89, and a freewheeling clutch 96 is interposed between the gear 95 and the tubular extension 97 of the hub 78. When the piston type clutch is disengaged, the freewheeling clutch 96 will pick up the drive and cause the shaft 89 to turn at a slower speed than the driving shaft 15b, but when the piston type clutch is engaged, the driven shaft 89 turns at the same speed with the driving shaft 15b and the freewheeling clutch 96 overrunning. The driven shaft 89 has a coupling 24b on the projecting end thereof for connection with the machinery to be driven.

Figs. 9 and 10 illustrate diagrammatically still another construction closely related to that shown in Fig. 1, but embodying dual planetary gearing between the torque converter and the driving shaft in accordance with my copending application, Serial No. 94,744 filed August 7, 1936. This construction is particularly suitable for motor vehicles where it is desirable to have a slow motor speed at the start but high efficiencies under ordinary running conditions. In this construction T₁ is the torque converter and 17c is the auxiliary gear box. The driving shaft 11c in this combination drives the impeller 12c indirectly through planetary gears, there being a ring gear 98 turning with the driving shaft and meshing with one of each of a series of dual planetary gears 99, the other of which pairs meshes with the sun gear 100 turning with the impeller 12c. The gears 99 are carried on a spider 101 turning with the secondary shaft 15c to which is also attached the turbine wheel 13c. The reaction member 14c is held stationary with the housing, as indicated at 102. The shaft 15c extends into the gear box 17c, which corresponds to the gear box 17 of Fig. 1 and has corresponding gears and piston type clutches therein, all numbered to agree with Fig. 1. In operation, with the turbine wheel 13c standing still, the speed of the pump impeller 12c will be substantially increased over the speed of the driving shaft 11c and can, therefore, carry a far greater load than if driven directly from the shaft 11c. As the turbine wheel 13c commences turning and increasing its speed, the ratio of impeller speed to drive shaft speed progressively decreases and the load carrying capacity of the impeller correspondingly decreases. This relationship of impeller speed to drive shaft speed is, therefore, ideal for a motor vehicle drive wherein the engine speed is low at starting and higher under running conditions. At high vehicle speed the torque is transmitted partly mechanically and partly hydraulically. Since only part of the torque is transmitted with hydraulic loss, the efficiency of the unit at high speeds will be higher than for the hydraulic torque converter alone. It is apparent that with the driving shaft 11c turning at a given speed a definite relationship must exist between the speeds of the impeller 12c and the turbine wheel 13c. If, therefore, the shaft 15c suddenly changes its speed due to the engagement of one of the piston type clutches at 31 or 41, the impeller 12c also has to change its speed if the driving shaft and the engine are supposed to maintain a virtually constant speed. This performance is entirely possible with the present combination inasmuch as the moments of inertia of all parts changing their speed can still be kept small in relation to the moments of inertia of the engine of the vehicle or other machinery being driven. The floating rotor in this case includes the planetary gears 99 and the sun gear 100, but in view of the fact that the planetary combination makes possible the use of smaller converters for the same power to be handled, the total moment of inertia of the floating rotor will be substantially the same as for that in a plain torque converter handling the same power.

It is believed the foregoing description conveys a good understanding of the objects and advantages of my invention. The appended claims have been drawn to cover all legitimate modifications and adaptations.

I claim:

1. A transmission comprising, in combination, a driving element, an intermediate driven element and a terminal driven element, a planetary gear train consisting of three members, the first being connected to the driving element and the second to the intermediate driven element, a hydraulic turbo ring drive comprising a driving rotor and a driven rotor, the driven rotor being connected to the intermediate driven element and the driving rotor being connected to the third member of the planetary gear train, reduction gearing for selectively connecting the intermediate driven element with the terminal driven element, said reduction gearing including a gear adapted to turn freely during idling, and a clutch to engage said gear to complete driving connection between the intermediate and terminal driven elements, said clutch having friction surfaces the area of which is a fraction of that usable in the absence of the hydraulic turbo ring drive, in a range down to one-twentieth of the area, and said surfaces being arranged to be held engaged under a pressure a plurality of times as high as that usable in the larger area clutches in the absence of the hydraulic turbo ring drive, in a range up to 40 times as high, whereby nearly all slip energy in the transmission of power is absorbed in the fluid of said turbo ring drive with minimum mechanical wear on the transmission.

2. In a hydraulic transmission, the combination with a driven element of a hydraulic torque converter comprising at least a pump element, a turbine element and a cooperating reaction element, and two-speed gearing for connecting the turbine element selectively to the driven element, each train of said two-speed gearing including a clutch having relatively small area frictional engaging surfaces arranged to be operated in engaged position under relatively high surface pressures, the area of the engaging surfaces being a fraction of that usable in the absence of the converter, in a range down to one-twentieth of the area, and said surfaces being arranged to be held engaged under a pressure a plurality of times as high as that usable in the larger area clutches in the absence of the converter, in a range up to forty times as high, said torque converter being of a type having its top efficiency at high turbine speeds, and the ratio between the two gear trains of the two-speed gearing being substantially equivalent to the ratio of the highest and lowest turbine speeds at which the converter efficiency remains above approximately 75%.

3. In a transmission, the combination of means including a hydraulic turbo-ring drive for transmitting drive from a driving element to a driven element, and a friction clutch of small diameter for completing the driving connection, said clutch being constructed and equipped to provide proportionately small area engaging surfaces for transmitting torque in the engaged position of said surfaces under high pressure, said clutch having friction surfaces the area of which is a fraction of that usable in the absence of the hydraulic turbo ring drive, in a range down to one-twentieth of the area, and said surfaces being arranged to be held engaged under a pressure a plurality of times as high as that usable in the larger area clutches in the absence of the hydraulic turbo ring drive, in a range up to 40 times as high, whereby nearly all slip energy in the transmission of power is absorbed in the fluid of said turbo ring drive with minimum mechanical wear on the transmission.

4. In a transmission, the combination of a hydraulic turbo-ring drive for transmitting drive from a driving element to a driven element, said turbo-ring drive including a runner, a multiple gear set for connecting the runner selectively with the driven element, said gear set including a gear adapted to turn freely during idling, and a clutch to engage said gear to complete the driving connection from the runner to the driven element, said clutch having friction surfaces the area of which is a fraction of that usable in the absence of the hydraulic turbo ring drive, in a range down to one-twentieth of the area, and said surfaces being arranged to be held engaged under a pressure a plurality of times as high as that usable in the larger area clutches in the absence of the hydraulic turbo ring drive, in a range up to 40 times as high, whereby nearly all slip energy in the transmission of power is absorbed in the fluid of said turbo ring drive with minimum mechanical wear on the transmission.

5. In a transmission, the combination of a hydraulic turbo-ring drive for transmitting drive from a driving element to a driven element, said turbo-ring drive including a runner, a multiple gear set for connecting the runner selectively with the driven element, said gear set including a gear adapted to turn freely during idling, a hub rotatable within said gear having one or more bores therein into which fluid under pressure is adapted to be delivered, and pressure responsive pistons in said bores movable outwardly into frictional engagement with the gear for a synchronizing clutch action to complete the driving connection between the runner and the driven element, said pistons having relatively small area frictional engaging surfaces and being operable under relatively high pressure, said clutch having friction surfaces the area of which is a fraction of that usable in the absence of the hydraulic turbo ring drive, in a range down to one-twentieth of the area, and said surfaces being arranged to be held engaged under a pressure a plurality of times as high as that usable in the larger area clutches in the absence of the hydraulic turbo ring drive, in a range up to 40 times as high, whereby nearly all slip energy in the transmission of power is absorbed in the fluid of said turbo ring drive with minimum mechanical wear on the transmission.

6. In a transmission, the combination of a hydraulic turbo-ring drive for transmitting drive from a driving element to a driven element, said turbo-ring drive including a runner, multistep gearing for connecting the runner selectively with the driven element, each step of said gearing including a gear adapted to turn freely during idling, and a clutch to engage said gear to complete the driving connection from the runner to the driven element, said clutch having friction surfaces the area of which is a fraction of that usable in the absence of the hydraulic turbo ring drive, in a range down to one-twentieth of the area and said surfaces being arranged to be held engaged under a pressure a plurality of times as high as that usable in the larger area clutches in the absence of the hydraulic turbo ring drive, in a range up to forty times as high.

7. In a transmission, the combination of a hydraulic turbo-ring drive for transmitting drive from a driving element to a driven element, said turbo-ring drive including a runner, multistep gearing for connecting the runner selectively with the driven element, each step of said gearing including a gear adapted to turn freely during idling, a hub rotatable within said gear having one or more bores therein into which fluid under pressure is adapted to be delivered, and pressure responsive pistons arranged in pairs in said bores movable outwardly away from one another into frictional engagement with the gear for a synchronizing clutch action to complete the driving connection between the runner and the driven element, said pistons having relatively small area frictional engaging surfaces and being operable under relatively high pressure, said clutch having friction surfaces the area of which is a fraction of that usable in the absence of the hydraulic turbo ring drive, in a range down to one-twentieth of the area and said surfaces being arranged to be held engaged under a pressure a plurality of times as high as that usable in the larger area clutches in the absence of the hydraulic turbo ring drive, in a range up to forty times as high.

8. In a transmission, the combination of a hydraulic turbo-ring drive for transmitting drive selectively in either direction from a driving element to a driven element, said turbo-ring drive including a runner, reverse gearing including a bevel gear turning with the runner, and opposed bevel gears meshing with the first gear and adapted to turn freely with respect to the driven element, and a clutch for each of said opposed bevel gears for selectively completing the driving connection between the runner and the driven element through either of said opposed bevel gears, said clutch having friction surfaces the area of which is a fraction of that usable in the absence of the hydraulic turbo ring drive, in a range down to one-twentieth of the area, and said surfaces being arranged to be held engaged under a pressure a plurality of times as high as that usable in the larger area clutches in the absence of the hydraulic turbo ring drive, in a range up to 40 times as high, whereby nearly all slip energy in the transmission of power in either direction is absorbed in the fluid of said turbo ring drive with minimum mechanical wear on the transmission.

9. In a transmission, the combination of a hydraulic turbo-ring drive for transmitting drive selectively in either direction from a driving element to a driven element, said turbo-ring drive including a runner, reverse gearing including a bevel gear turning with the runner, and opposed bevel gears meshing with the first gear and adapted to turn freely with respect to the driven element, a hub inside each of the opposed bevel gears and adapted to turn relative thereto with the driven element, each of said hubs having a plurality of bores therein into which fluid under pressure is adapted to be delivered, and pressure responsive pistons arranged in pairs in said bores movable outwardly away from one another into frictional engagement with the adjacent gear for synchronizing clutch action to complete the driving connection between the runner and the driven element through either of said opposed bevel gears, said pistons having relatively small area frictional engaging surfaces and being operable under relatively high pressure, said clutch having friction surfaces the area of which is a fraction of that usable in the absence of the hydraulic turbo ring drive, in a range down to one-twentieth of the area, and said surfaces being arranged to be held engaged under a pressure a plurality of times as high as that usable in the larger area clutches in the absence of the hydraulic turbo ring drive, in a range up to 40 times as high, whereby nearly all slip energy in the transmission of power in either direction is absorbed in the fluid of said turbo ring drive with minimum mechanical wear on the transmission.

10. A power transmission comprising in combination with a driven shaft adapted to be driven in either direction, a hydraulic turbo ring drive, said power transmission means between said drive and said shaft to transmit the power mechanically to the shaft for forward or reverse rotation, said turbo ring drive including a rotary pump impeller, rotary turbine wheel, and stationary reaction member, the turbine wheel of the turbo ring drive and connected parts of said power transmission mechanism together forming a floating rotor, and said power transmission mechanism including clutch means for completing driving connection between the floating rotor and the driven shaft for driving the same selectively in either direction, said clutch having friction surfaces the area of which is a fraction of that usable in the absence of the hydraulic turbo ring drive, in a range down to one-twentieth of the area, and said surfaces being arranged to be held engaged under a pressure a plurality of times as high as that usable in the larger area clutches in the absence of the hydraulic turbo ring drive, in a range up to 40 times as high, whereby nearly all slip energy in the transmission of power in either direction is absorbed in the fluid of said turbo ring drive with minimum mechanical wear on the transmission.

11. In a transmission, the combination with driving and driven elements of a hydraulic turbo ring drive for transmitting drive from the driving element to the driven element and including a runner, gearing for connecting the runner selectively with the driven element, said gearing including a gear adapted to turn freely during idling, the gear and runner forming portions of a floating rotor, and a clutch to engage said gear and complete the driving connection from the floating rotor to the driven element, said clutch having friction surfaces having an area a fraction of that used in conventional friction clutches but transmitting torque in engaged position under surface pressures a plurality of times the friction surface pressure of said conventional friction clutches.

12. In a power transmission mechanism, the combination with a driving shaft, a secondary shaft and a terminal driven shaft, of a hydraulic turbo ring drive and a multiple gear set, said turbo ring drive including a driven member connected to said secondary shaft, said multiple gear set comprising mechanical power transmission means for transmitting power from the secondary shaft to the terminal driven shaft in more than one speed relationship between the two shafts, and clutch means for completing the driving connection for all speeds except the slowest speed of the terminal driven shaft, said clutch means having friction surfaces the area of which is a fraction of that usable in the absence of the turbo ring drive, in a range down to one-twentieth of the area, and said surfaces being arranged to be held engaged under a pressure a plurality of times as high as that usable in the larger area clutches in the absence of the turbo ring drive, in a range up to forty times as high, and a freewheeling clutch for completing the low speed drive of said shaft, said clutch being arranged to overrun during all other drives of said terminal driven shaft.

13. A power transmission as set forth in claim 3, wherein the friction clutch comprises a clutch drum, and a hub coaxially aligned therewith and rotatable inside the drum and having a plurality of bores provided therein, the drum being carried by one of the driving and driven elements and the hub being carried by the other of said elements, pistons slidable in pairs in said bores and arranged to be extended therefrom in opposite directions with respect to one another into engagement with the drum, and means for applying hydraulic pressure selectively to the inside of said bores.

14. Power transmission mechanism comprising, in combination, a hydraulic turbo-ring drive for transmitting drive from a driving element to an intermediate driven element and thence to a terminal driven element in coaxially aligned relation to the intermediate driven element, a drive gear on the intermediate element, a gear rotatable on the terminal element, intermediate gears transmitting drive from the drive gear to the last mentioned gear, a freewheeling clutch cam fixed on the terminal element and providing mounting for the associated gear, freewheeling rollers working on the periphery of said cam within said gear, and means adapted to frictionally clutch the freewheeling cam to turn with the aforesaid drive gear to transmit direct drive from the intermediate element to the terminal element, the freewheeling rollers being adapted to overrun during direct drive, said clutch means comprising a clutch housing turning with the drive gear, a hub turning with the freewheeling cam inside said housing and having small bores provided therein adapted to have fluid under high pressure delivered thereto, and a piston slidable in each of said bores under fluid pressure into engagement with the housing, the pistons having engaging surfaces the area of which is a fraction of that usable in the absence of a turbo ring drive, and said surfaces being arranged to be held engaged under a pressure a plurality of times as high as that usable in the absence of the turbo-ring drive.

15. Means for clutching two coaxially rotating bodies to rotate together in synchronism comprising, in combination, a hydraulic turbo ring drive and a friction clutch of small diameter, said clutch comprising relatively rotatable members having friction surfaces proportionately smaller in area than are provided in automotive type friction disk clutches arranged to be engaged under relatively low engaging pressure and constructed to operate with some slippage, the clutch including means for transmitting torque under high pressure, said clutch having friction surfaces the area of which is a fraction of that usable in the absence of the hydraulic turbo ring drive, in a range down to one-twentieth of the area, and said surfaces being arranged to be held engaged under a pressure a plurality of times as high as that usable in the larger area clutches in the absence of the hydraulic turbo ring drive, in a range up to forty times as high, whereby the friction clutch serves the main function of transmitting power from one of said bodies to the other as a mere coupling and substantially without slippage, said hydraulic turbo ring drive including driving and driven wheels, one of the clutch members being connected to turn with one of the rotating bodies, the driving wheel being connected to turn with the other of said rotating bodies, and the driven wheel being connected to turn with the other of said friction clutch members whereby said hydraulic turbo ring drive serves the purpose of synchronizing the two rotating bodies.

16. In a power transmission, the combination of driving and driven elements, the driving element turning with a prime mover involving heavy mass and large moment of inertia, the driven element turning with driven machinery also involving heavy mass and large moment of inertia, a hydraulic turbo-ring drive including a rotary pump impeller, rotary turbine wheel and stationary reaction member, the turbine wheel forming part of a floating rotor of relatively little mass and small moment of inertia, intermediate gearing adapted to connect the turbine wheel with the driven element, including one or more gears which with the turbine wheel complete the floating rotor of little mass and small moment of inertia, one of said gears being adapted to turn freely during idling, and a clutch to engage said gear and complete the driving connection between the floating rotor and the driven element, said clutch having friction surfaces the area of which is a fraction of that usable in the absence of the hydraulic turbo ring drive, in a range down to one-twentieth of the area, and said surfaces being arranged to be held engaged under a pressure a plurality of times as high as that usable in the larger area clutches in the absence of the hydraulic turbo ring drive, in a range up to 40 times as high, whereby nearly all slip energy in the transmission of power is absorbed in the fluid of said turbo ring drive with minimum mechanical wear on the transmission.

17. In a power transmission, the combination of means including driving and driven elements, the driving element turning with a prime mover involving heavy mass and large moment of inertia, the driven element turning with driven machinery also involving heavy mass and large moment of inertia, a hydraulic turbo-ring drive including a rotary pump impeller, rotary turbine wheel and stationary reaction member, the turbine wheel forming part of a floating rotor of relatively little mass and small moment of inertia, intermediate gearing adapted to connect the turbine wheel with the driven element, including one or more gears which with the turbine wheel complete the floating rotor of little mass and small moment of inertia, one of said gears being adapted to turn freely during idling, and a friction clutch of small diameter having proportionately small area frictional engaging surfaces and including means for causing engagement thereof under high pressure for completing through said gear the driving connection between the floating rotor and the driven element.

18. A power transmission mechanism as set forth in claim 3, wherein the friction clutch comprises a clutch drum, and a hub coaxially aligned therewith and rotatable inside the drum and having a plurality of bores provided therein, the drum being carried by one of the driving and driven elements and the hub being carried by the other of said elements, pistons slidable in pairs in said bores and arranged to be extended therefrom in opposite directions with respect to one another into engagement with the drum, and means for applying hydraulic pressure selectively to the inside of said bores, the pistons having a number of arcuate ridges formed on the outer ends thereof arranged to engage wedgingly in annular grooves provided on the inside of said drum.

19. A power transmission, comprising a hydraulic torque transformer forming a hydraulic transmission unit, a drive shaft operatively connected with said hydraulic transmission unit, a driven shaft adapted to be connected with said hydraulic transmission unit, and a friction clutch for connecting said driven shaft with said unit but absorbing little slip energy, said clutch having friction surfaces the area of which is a fraction of that which would otherwise be required to transmit the same torque reliably in the absence of the hydraulic transmission unit, in a range down to one-twentieth of the area.

20. A power transmission, comprising a hydraulic torque transformer forming a hydraulic transmission unit, a drive shaft operatively connected with said hydraulic transmission unit, a driven shaft adapted to be connected with said hydraulic transmission unit, and a friction clutch for connecting said driven shaft with said unit but absorbing little slip energy, said clutch having friction surfaces arranged to be held engaged under a pressure a plurality of times as high as that used in friction clutches, in the absence of a hydraulic torque transformer, in a range up to forty times as high.

21. A power transmission, comprising a hydraulic torque transformer forming a hydraulic transmission unit, a drive shaft operatively connected with said hydraulic transmission unit, a driven shaft adapted to be connected with said hydraulic transmission unit, and a friction clutch for connecting said driven shaft with said unit but absorbing little slip energy, said clutch having friction surfaces the area of which is a fraction of that which would otherwise be required to transmit the same torque reliably in the absence of the hydraulic transmission unit, in a range down to one-twentieth of the area, said surfaces being arranged to be held engaged under a pressure above one hundred pounds per square inch.

HEINRICH SCHNEIDER.